United States Patent [19]

Kishida et al.

[11] Patent Number: 4,460,742

[45] Date of Patent: Jul. 17, 1984

[54] DELUSTERED THERMOPLASTIC RESIN COMPOSITION

[75] Inventors: Kazuo Kishida, Ohtake; Akira Hasegawa, Hiroshima; Masahiro Sugimori, Ohtake, all of Japan

[73] Assignee: Mitsubishi Rayon Company, Limited, Tokyo, Japan

[21] Appl. No.: 324,269

[22] Filed: Nov. 23, 1981

Related U.S. Application Data

[63] Continuation-in-part of Ser. No. 204,169, Nov. 5, 1980, abandoned.

[30] Foreign Application Priority Data

Nov. 26, 1979 [JP] Japan ................................ 54-152564

[51] Int. Cl.³ ...................... C08L 25/14; C08L 51/06; C08L 27/06; C08L 33/04
[52] U.S. Cl. ......................................... 525/64; 525/66; 525/67; 525/71; 525/81; 525/82; 525/85; 525/227; 525/228; 524/504
[58] Field of Search ..................... 525/227, 81, 82, 85, 525/227, 228, 305, 309, 64, 66, 67, 71

[56] References Cited

U.S. PATENT DOCUMENTS

| 3,055,859 | 9/1962 | Vollmert | 525/227 |
|---|---|---|---|
| 3,311,582 | 3/1967 | Sparks et al. | 525/227 |
| 3,345,434 | 10/1967 | Griffith | 525/227 |
| 3,450,796 | 6/1969 | Griffin | 525/305 |
| 3,678,133 | 7/1972 | Ryan | 525/82 |
| 3,681,475 | 8/1972 | Spilner | 525/81 |
| 3,830,878 | 8/1974 | Kato et al. | 525/82 |
| 3,859,384 | 1/1975 | Carty et al. | 525/228 |
| 3,957,921 | 5/1976 | Iwahashi et al. | 525/228 |
| 4,277,573 | 7/1981 | Irzuka et al. | 525/85 |

FOREIGN PATENT DOCUMENTS

| 1035790 | 7/1966 | United Kingdom | 525/305 |
|---|---|---|---|
| 1117124 | 6/1968 | United Kingdom | 525/305 |
| 1453109 | 10/1976 | United Kingdom | |
| 2033909 | 5/1980 | United Kingdom | |

*Primary Examiner*—Carman J. Seccuro
*Attorney, Agent, or Firm*—Oblon, Fisher, Spivak, McClelland & Maier

[57] ABSTRACT

A delustered thermoplastic resin composition which comprises 100 parts by weight of a thermoplastic resin (B); and 0.1 to 40 parts by weight of a resin (A) which essentially consists of:

80 to 20 parts by weight of a polymer or a copolymer component (I) obtained by polymerizing;
(a) 30 to 100% by weight of at least one monomer selected from the group consisting of an alkyl methacrylate in which the alkyl group has 1 to 4 carbon atoms and an aromatic vinyl compound;
(b) 0 to 70% by weight of an alkyl acrylate in which the alkyl group has 1 to 13 carbon atoms;
(c) 0 to 50% by weight of a monoethylenically unsaturated monomer other than those of (a) and (b); and
(d) 0 to 5 parts by weight of a crosslinking monomer per 100 parts by weight of the total amount of the above components (a), (b), and (c); and 20 to 80 parts by weight of a copolymer component (II) obtained by polymerizing;
(e) 30 to 90% by weight of an aromatic vinyl compound;
(f) 10 to 60% by weight of at least one alkyl acrylate monomer in which the alkyl group has 1 to 13 carbon atoms;
(g) 0 to 20% by weight of a monoethylenically unsaturated monomer other than those of (e) and (f); and
(h) 0.05 to 10 parts by weight of a crosslinking monomer per 100 parts by weight of the total amount of the above components (e), (f) and (g).

7 Claims, No Drawings

DELUSTERED THERMOPLASTIC RESIN COMPOSITION

CROSS REFERENCE TO RELATED APLICATIONS

This application is a continuation-in-part of application Ser. No. 204,169 filed Nov. 5, 1980 now abandoned.

BACKGROUND OF THE INVENTION

1. Field of the Invention

The present invention relates to a delustered thermoplastic resin composition.

2. Description of the Prior Art

Molded products of thermoplastic resins such as of vinyl chloride resin and ABS resin have luster. Although the luster may serve as an important property depending upon the purposes, it is often desired to eliminate the luster.

In order to deluster the thermoplastic resins, it has heretofore been attempted to perform the pattern embossing treatment and to perform the delustering coating because they do not deteriorate the properties of the thermoplastic resins. These methods, however, require clumsy steps as well as increased cost, while presenting such a problem that the delustering effect does not last long.

It has also been attempted to add a delustering agent of the inorganic type of the high molecular polymer type. This method does not hinder the processability and gives the delustering effect which lasts for extended periods of time, but gives a serious defect that the properties of the resins become inferior. In particular, the inorganic delustering agent such as amorphous silica or calcium carbonate, which had been chiefly used as the delustering agent of the addition type, causes the physical properties of the resins to be worse and can not be practically used.

On the other hand, when the delustering agent of the high molecular polymer type is used, it is possible to diminish a lowering of physical properties by using a delustering agent having a better compatibility with the resin. However, in such case, the delustering effect is often diminished because the compatibility with respect to the thermoplastic resin conflicts the delustering efect, and this conflicting nature of the compatibility and the delustering effect has prevented the development of excellent delustering agent.

SUMMARY OF THE INVENTION

The object of the present invention is to provide an excellent delustering agent, physical properties of which are not substantially deteriorated and which can be commercially produced.

PREFERRED EMBODIMENT OF THE INVENTION

The present invention deals with a delustering thermoplastic resin composition comprising 100 parts by weight of a thermoplastic resin (B) blended with 0.1 to 40 parts by weight of a mixture ($A_1$) of a polymer or a copolymer (component I) from the below-mentioned monomers (a) to (d) and a copolymer (component II) from the below-mentioned monomers (e) to (h), with 0.1 to 40 parts by weight of a copolymer ($A_2$) obtained by polymerizing a mixture of the monomers (e) to (h) in the presence of a polymer or a copolymer (component I) from the monomers (a) to (d), or with 0.1 to 40 parts by weight of a copolymer ($A_3$) obtained by polymerizing the monomer (a) or a mixture of the monomers (a) to (d) in the presence of the copolymer (component II) from monomers (e) to (h).

Monomers for component I:

| | | |
|---|---|---|
| (a) | At least one monomer selected from the group consisting of an alkyl methacrylate in which the alkyl group has 1 to 4 carbon atoms and an aromatic vinyl compound | 30–100% by weight |
| (b) | Alkyl acrylate in which the alkyl group has 1 to 13 carbon atoms | 0–70% by weight |
| (c) | Any other monoethylenically unsaturated monomer | 0–50% by weight |
| (d) | Crosslinking monomer | 0–5 parts by weight per 100 parts by weight of (a), (b) and (c). |

Monomers for component II:

| | | |
|---|---|---|
| (e) | Aromatic vinyl monomer | 30–90% by weight |
| (f) | At least one alkyl acrylate monomer in which the alkyl group has 1 to 13 carbon atoms | 10–60% by weight |
| (g) | Any other monoethylenically unsaturated monomer | 0–20% by weight |
| (h) | Crosslinking monomer | 0.05–10 parts by weight per 100 parts by weight of (e), (f) and (g). |

According to the present invention, the polymer or copolymer (component I) part from monomers (a) to (d) and the copolymer (component II) part from monomers (e) to (h) are essential requirements. When either component I or II was used, sufficient delustering effect can not be obtained, of insufficient compatibility with the thermoplastic resin (B) causes the physical properties of the final product to be seriously deteriorated. The ratio of the component (I) to the component (II) should suitably lie from 80:20 to 20:80 on the basis of weight.

As explained above, suitable monomers for constituting the component (I) include 30 to 100% by weight of alkyl methacrylate in which the alkyl group has 1 to 4 carbon atoms and/or aromatic vinyl monomer, 0 to 70% by weight of alkyl acrylate in which the alkyl group has 1 to 13 carbon atoms, and 0 to 50% by weight of any other monoethylenically unsaturated monomer. It is also allowable to use 5 parts by weight or less of a crosslinking monomer per 100 parts by weight of the above-mentioned monomers.

The component (I) works to impart compatibility with the thermoplastic resin to the delustering agent. This can be accomplished by using at least 30% by weight of alkyl methacrylate in which the alkyl group has 1 to 4 carbon atoms and/or an aromatic vinyl monomer as represented by styrene. There can also be used a crosslinking monomer. Use of the crosslinking monomer in excess amounts, however, causes the compatibility to be decreased. Therefore, the crosslinking monomer should be used in a minimum amount.

Suitable monomers for constituting the component (II) include 30 to 90% by weight of aromatic vinyl monomer, 10 to 60% by weight of an acrylate and 0 to 60% by weight of any other monoethylenically unsaturated monomer. Further, a crosslinking monomer is used in an amount of 0.05 to 10 parts by weight per 100 parts by weight of these monomers. The component (II) is essential for delustering. A crosslinked polymer of which the main components are aromatic vinyl and acrylate exhibits a particularly excellent delustering effect. The component (II) alone, however, is insufficient in compatibility with the thermoplastic resin and does not help to obtain an excellent delustering agent, unless it is used in combination with the component (I).

Representative examples of the monoethylenically unsaturated monomers which can be included in the monomers for the component I or II will be fumaric acid, maleic acid and carboxylic acid copolymerizable therewith as well as esters thereof, halogenated vinyl compound such as vinyl chloride and vinyl bromide, vinyl esters such as vinyl acetate, and acrylonitriles.

The crosslinking monomer is not essential for the component (I) but is essential for the component (II). When the crosslinking monomer is not used in the component (II), sufficient delustering effect is not obtained. Any crosslinking monomer may be used such as ordinarily employed polyfunctional monomer, e.g., polyvinylbenzenes and esters of unsaturated carboxylic acid. Particularly preferred examples will be allyl compounds such as allyl methacrylate, triallyl cyanurate, triallyl isocyanurate, and the like.

A mixture ($A_1$) of the polymer or copolymer component (I) and the copolymer component (II), a copolymer ($A_2$) formed by polymerizing a mixture of the monomers for the component (II) in the presence of the component (I), and a copolymer ($A_3$) formed by polymerizing the monomer (a) or a mixture of monomers (a) to (d) for the component (I) in the presence of the copolymer component (II), can be obtained by using the emulsion polymerization, multistage emulsion polymerization, or by using the emulsion suspension polymerization in which the emulsion polymerization is effected in the first stage and the thus formed latex is once softly coagulated and is then subjected to the suspension polymerization by adding monomers in the second stage. The polymerization method, however, need not necessarily be limited thereto.

In particular, when the resin obtained by the emulsion polymerization is added to a plasticized vinyl chloride resin or the like, excellent dispersibility is exhibited as compared with other resins that are formed by other polymerization methods such as suspension polymerization.

When the resin A ($A_1$, $A_2$ or $A_3$) is to be obtained by the emulsion polymerization, it has preferably an average particle size of greater than 0.1μ and, particularly greater tna 0.3μ to produce increased effect of delustering. Namely, greater particle size is preferred so far as the stability of the formed latex is not deteriorated.

In carrying out the polymerization to obtain the resin, it is allowable to use a polymerization regulator such as n-octyl mercaptan or t-dodecyl mercaptan. In many cases, it is often preferable to adjust the distribution of the molecular weight by using such a polymerization regulator.

Representative examples of the thermoplastic resin which exhibits the delustering effect when blended with the resin ($A_1$), the resin ($A_2$) or the resin ($A_3$), include vinyl chloride resin, ABS resin, (meth)acrylic resin, methyl methacrylate/butadiene/styrene resin (MBS resin), nylon, polyethylene, polycarbonate, polyethylene terephthalate, and the like.

The delustering agent will be blended into the thermoplastic resin in an amount of 40 parts by weight or less per 100 parts by weight of the thermoplastic resin. The delustering effect, however, can be sufficiently exhibited even when the delustering agent is blended in an amount of 10 parts by weight or less.

In addition, by blending such a delustering agent into the thermoplastic resin, the surface of the molded article obtained from the blend is necessarily rough and, as the result, blocking between molded articles is often prevented. Such an anti-blocking effect is notable in case of plasticized or semirigid polyvinylchloride.

As required, the composition of the present invention can be blended with general additives such as stabilizers, lubricants, processing aids, impact resistance aids, plasticizers, foaming agents, fillers, coloring agents, and the like.

In the following examples, parts and % are all by weight.

EXAMPLE 1

(1) Preparation of the component (I)

250 Parts of water, monomers in parts shown in Table 1, 1 part of sodium N-lauroyl sarcosinate and 0.3 part of potassium persulfate were fed into a reaction vessel equipped with a stirrer, a reflux condenser and an opening for introducing nitrogen gas. After the interior of the vessel was sufficiently substituted with nitrogen gas, the above-mentioned components were heated at 70° C. for 4 hours to polymerize the monomers with stirring to obtain latexes having a polymerization rate of about 96%.

TABLE 1

| Monomer | (I)-1 | (I)-2 | (I)-3 | (I)-4 | (I)'-1 |
|---|---|---|---|---|---|
| Methyl methacrylate | 100 | 80 | 80 | 0 | 20 |
| Butyl acrylate | 0 | 20 | 20 | 40 | 80 |
| Styrene | 0 | 0 | 0 | 60 | 0 |
| Allyl methacrylate | 0 | 0 | 0.5 | 0 | 0 |

Measurement by the light transmission method indicated that particles in the latexes of (I)-1 to (I)-4 possessed particle diameters of 0.3 to 0.4 micron. The latexes were salted out by the addition of 5 parts of calcium chloride, and were further dehydrated, washed with water and were dried to obtain powdery polymers.

In the case of (I)'-1, on the other hand, the resulting product exhibited a rubbery state.

(2) Preparation of the component (II)

250 Parts of water, monomers in parts shown in Table 2, 1 part of sodium N-lauroyl sarcosinate and 0.2 part of benzoyl peroxide were fed into the same reaction vessel as used in the preparation of the component (I). After the interior of the vessel was sufficiently substituted with nitrogen gas, the above-mentioned components were heated at 75° C. for 5 hours to polymerize the monomers with stirring to obtain latexes having a polymerization rate of 95%.

TABLE 2

|  | (II)-1 | (II)-2 | (II)-3 | (II)-4 | (II)'-1 | (II)'-2 | (II)'-3 |
|---|---|---|---|---|---|---|---|
| Styrene | 60 | 70 | 61 | 61 | 60 | 100 | 20 |
| Ethyl acrylate | 40 | 0 | 20 | 0 | 40 | 0 | 40 |
| Butyl acrylate | 0 | 30 | 0 | 20 | 0 | 0 | 0 |
| Methyl methacrylate | 0 | 0 | 19 | 0 | 0 | 0 | 0 |
| Acrylonitrile | 0 | 0 | 0 | 19 | 0 | 0 | 40 |
| Triallyl cyanurate | 2 | 2 | 2 | 2 | 0 | 2 | 2 |

Measurement by the light transmission method indicated that particles in the thus obtained latexes possessed particle diameters of 0.3 to 0.4μ. Powdery cross-linked polymers were obtained from the above latexes through the same procedure as employed for the preparation of the component (I).

(3) Preparation of the resin ($A_1$)

Polymers (I)-1 to (I)-4 and polymers (II)-1 to (II)-4 or (II)'-1 to (II)'-3 were mixed together at ratios shown in Table 3 to prepare the resins ($A_1$). The resins ($A_1$) were added each in an amount of 7 parts to 100 parts of the in thickness. The board was measured for its V-notched Charpy impact strength. The measured results were as shown in Table 3.

Table 3 also illustrates the measured results when no delustering agent was added, when a silica gel was added as a representative example of the inorganic delustering agent, and when a commercially available high molecular delustering agent was added.

As will be obvious from Table 3, the compositions of the present invention exhibit superior delustering property and impact resistance to the compositions of comparative examples.

TABLE 3

| Resin blended | (I)-1 | (I)-2 | (I)-3 | (I)-4 | (II)-1 | (II)-2 | (II)-3 | (II)-4 | (II)'-1 | (II)'-2 | (II)'-3 | 60° Specular gloss (%) | Charpy impact strength (kg-cm/cm²) | Remarks |
|---|---|---|---|---|---|---|---|---|---|---|---|---|---|---|
| Resin ($A_1$)-1 | 50 |  |  |  | 50 |  |  |  |  |  |  | 23 | 15.9 | Present invention |
| Resin ($A_1$)-2 |  | 50 |  |  | 50 |  |  |  |  |  |  | 28 | 17.2 | Present invention |
| Resin ($A_1$)-3 |  |  | 50 |  | 50 |  |  |  |  |  |  | 24 | 15.1 | Present invention |
| Resin ($A_1$)-4 |  |  |  | 50 | 50 |  |  |  |  |  |  | 27 | 16.3 | Present invention |
| Resin ($A_1$)-5 |  | 50 |  |  |  | 50 |  |  |  |  |  | 31 | 17.5 | Present invention |
| Resin ($A_1$)-6 |  | 50 |  |  |  |  | 50 |  |  |  |  | 24 | 16.8 | Present invention |
| Resin ($A_1$)-7 |  | 50 |  |  |  |  |  | 50 |  |  |  | 26 | 16.5 | Present invention |
| Resin ($A_1$)-8 |  | 70 |  |  | 30 |  |  |  |  |  |  | 35 | 18.6 | Present invention |
| Resin ($A_1$)-9 |  | 30 |  |  | 70 |  |  |  |  |  |  | 21 | 14.5 | Present invention |
| Resin ($A_1$)'-1 | 50 |  |  |  |  |  |  |  | 50 | 50 |  | 65 | 18.9 | Comparative example |
| Resin ($A_1$)'-2 | 50 |  |  |  |  |  |  |  |  |  |  | Poorly dispersed | 8.9 | Comparative example |
| Resin ($A_1$)'-3 | 50 |  |  |  |  |  |  |  |  |  | 50 | Poorly dispersed | 8.2 | Comparative example |
| Resin ($A_1$)'-4 | 100 |  |  |  |  |  |  |  |  |  |  | 75 | 20.5 | Comparative example |
| Resin ($A_1$)'-5 |  |  |  |  | 100 |  |  |  |  |  |  | Poorly dispersed | 7.8 | Comparative example |
| Resin ($A_1$)'-6 | Silica gel |  |  |  |  |  |  |  |  |  |  | 46 | 0.8 | Comparative example |
| Resin ($A_1$)'-7 | Commercially available delustering agent |  |  |  |  |  |  |  |  |  |  | 40 | 10.5 | Comparative example |
| Resin ($A_1$)'-8 | None |  |  |  |  |  |  |  |  |  |  | 81 | 20.9 | Comparative example | blend (1) of thermoplastic resin (B) with several additives, and composition of said blend (1) will be mentioned below. The mixture was kneaded by a roll at 165° C. to obtain a sheet. The sheet was measured for its 60° specular gloss. Further, several pieces of the sheet were superposed and were compression-molded at 165° C. under a pressure of 40 kg/cm², to prepare a board 5 mm

| Composition of blend (1): | |
|---|---|
| Vinyl chloride resin ($\overline{P} = 700$) | 100 parts |
| Stabilizer (dibutyltin maleate) | 3 parts |
| Impact resistance aid | 10 parts |

-continued

| Composition of blend (1): | |
|---|---|
| (Metablen ® C-102, Mitsubishi Rayon Co.) Processing aid (Metablen ® P-551, Mitsubishi Rayon Co.) | 1 part |
| Lubricant (butyl stearate) | 1 part | were measured in the same manner as in Example 1. The results were as shown in Table 4.

The compositions of the present invention exhibit excellent delustering property and impact resistance over the compositions of comparative examples.

TABLE 4

| | First-stage monomer | | | | | Second-stage monomer | | | | | |
|---|---|---|---|---|---|---|---|---|---|---|---|
| | Methyl methac-rylate | Butyl acrylate | Ethyl acrylate | Styrene | Allyl methac-rylate | Styrene | Ethyl acrylate | Butyl acrylate | Methyl methac-rylate | Acryloni-trile | Allyl methac-rylate |
| Resin (A$_2$)-1 | 27 | 3 | | | | 42 | 28 | | | | 2 |
| Resin (A$_2$)-2 | 45 | 5 | | | | 30 | | 20 | | | 1.5 |
| Resin (A$_2$)-3 | 40 | 10 | | | | 31 | 10 | | 9 | | 2 |
| Resin (A$_2$)-4 | 48 | 12 | | | | 25 | 8 | | | 7 | 2 |
| Resin (A$_3$)-1 | | | 28 | 42 | 2 | | | 3 | 27 | | |
| Resin (A$_3$)-2 | 9 | | 10 | 31 | 1 | | | 10 | 40 | | 0.5 |
| Resin (A$_3$)-3 | 9 | | 10 | 31 | 2 | 30 | | 20 | | | |
| Resin (A$_2$)'-1 | 10 | 40 | | | | 30 | 20 | | | | 2 |
| Resin (A$_2$)'-2 | 45 | 5 | | | | 30 | 20 | | | | 0 |
| Resin (A$_2$)'-3 | 40 | 10 | | | | 10 | 20 | | 20 | | 2 |
| Resin (A$_3$)'-1 | 20 | | 20 | 10 | 2 | | 5 | | 45 | | |

| | P.R. t-dodecyl mercaptan | 60° Specular gloss % | Charpy impact strength (kg-cm/cm$^2$) | Remarks |
|---|---|---|---|---|
| Resin (A$_2$)-1 | 0.05 | 27 | 17.5 | Present invention |
| Resin (A$_2$)-2 | | 25 | 17.3 | Present invention |
| Resin (A$_2$)-3 | | 23 | 16.5 | Present invention |
| Resin (A$_2$)-4 | 0.03 | 24 | 16.7 | Present invention |
| Resin (A$_3$)-1 | | 28 | 16.8 | Present invention |
| Resin (A$_3$)-2 | 0.07 | 21 | 15.9 | Present invention |
| Resin (A$_3$)-3 | | 26 | 16.3 | Present invention |
| Resin (A$_2$)'-1 | | 62 | 19.1 | Comparative Example |
| Resin (A$_2$)'-2 | | 71 | 20.3 | Comparative Example |
| Resin (A$_2$)'-3 | | Poorly dispersed | 7.7 | Comparative Example |
| Resin (A$_3$)'-1 | | Poorly dispersed | 9.5 | Comparative Example |

P.R.: Polymerization regulator

EXAMPLE 2

250 Parts of water, monomers of the first stage in parts as shown in Table 4, 1 part of sodium N-lauroyl sarcosinate and 0.3 part of potassium persulfate were introduced into the same reaction vessel as used for the preparation of the component (I) of Example 1. After the interior of the vessel was sufficiently substituted with nitrogen, the above-mentioned components were heated at 75° C. for 2 hours to polymerize the monomers with stirring. Thereafter, monomers of the second stage and polymerization regulator in parts as shown in Table 4 and 0.2 part of benzoyl peroxide were introduced into the vessel to perform the polymerization for 5 hours. Latexes were obtained having a polymerization rate of 96% and an average particle size of 0.35μ.

The resins (A$_2$) and (A$_3$) were obtained from the thus prepared latexes in the same manner as the preparation of the component (I) of Example 1. Further, the resin (A$_2$) or (A$_3$) was added each in an amount of 7 parts to 100 parts of the blend (1). The 60° specular gloss and Charpy impact strength of the resulting compositions

EXAMPLE 3

250 Parts of water, 0.15 part of sodium N-lauroyl sarcosinate and 0.2 part of sodium formaldehyde sulfoxylate were fed into a reaction vessel equipped with a stirrer and a reflux condenser.

After the interior of the vessel was sufficiently substituted with nitrogen, the above-mentioned components were heated to 75° C. with stirring.

Then, the monomer mixture of the first stage in parts as shown in Table 5 and cumene hydroperoxide (0.1 part per 100 parts of monomers) was added to the reaction vessel over a period of 60 minutes and the reaction vessel was further agitated for 60 minutes to complete the first stage polymerization.

Before introducing the second stage monomers, the mixture of 10 parts of water, 0.6 part of sodium N-lauroyl sarcosinate and 0.1 part of sodium formaldehyde sulfoxylate was added to the vessel, and then the monomer mixture of the first stage in parts as shown in Table 5 which was contained 0.2% of cumene hydroperoxide was added to the vessel over a period of 120 minutes and the vessel was further agitated for 180 minutes to complete the second stage polymerization.

The latex having a polymerization rate of 96% and an average particle diameter of about 0.5μ was obtained.

the compositions in the same manner as in Example 1. The results were as shown in Table 6.

The compositions of the present invention exhibited excellent delustering property and impact resistance.

TABLE 6

| | First-stage monomer | | | | Second-stage monomer | | | | 60° Specular gloss (%) | Charpy impact strength (kg-cm/cm$^2$) |
|---|---|---|---|---|---|---|---|---|---|---|
| | Methyl meth-acrylate | Butyl acrylate | Ethyl acrylate | Styrene | Allyl methy-acrylate | Methyl methy-acrylate | Ethyl acrylate | Styrene | Allyl meth-acrylate | |
| Resin (A$_2$)-8 | 54 | 6 | | | | | 16 | 24 | 1 | 22 | 16.5 |
| Resin (A$_3$)-4 | 7 | 8 | | 25 | 1.5 | 54 | 6 | | | 25 | 17.8 |
| Resin (A$_3$)-5 | | | 24 | 36 | 2 | 40 | | | | 24 | 17.2 |

The latex was salted out by the addition of 5 parts of calcium chloride, and was further dehydrated, washed with water and was dried to obtain powdery polymer.

Further, the resin (A2) was blended in an amount of 7 parts to 100 parts of the blend (1'), and the obtained mixture was extrusion-molded to prepare a film 100μ in thickness.

The 60° specular glosses of the films are shown in Table 5.

| Composition of blend (1): | |
|---|---|
| Vinyl chloride resin ($\bar{P}$ = 700) | 100 parts |
| Dibutyltin maleate | 3 parts |
| Impact resistance aid (Metablen ® C-102) | 10 parts |
| Processing aid (Metablen ® P-551) | 1 part |
| Lubricant | 1.5 parts |

EXAMPLE 5

5 Parts of resins (A$_1$), (A$_2$) and (A$_3$) shown in Table 7, and 5 parts of silica gel or a commercially available delustering agent were blended to the blend (2) of thermoplastic resin (B) with several additives (composition of said blend (2) will be mentioned below), and were kneaded by a roll heated at 155° C. to obtain sheets. The sheets were measured for their 60° specular gloss. The results were as shown in Table 7. From Table 7, it will be understood that the compositions of the present invention exhibit superior delustering effect to the compositions of comparative examples.

| Composition of blend (2): | |
|---|---|
| Vinyl chloride resin ($\bar{P}$ = 1100) | 100 parts |
| Plasticizer (dioctyl phthalate) | 50 parts |
| Cd—Ba type stabilizer | 2.5 parts |
| Stearic acid | 0.3 part |

TABLE 5

| | First-stage monomer | | | | Second-stage monomer | | | 60° Specular gloss (%) |
|---|---|---|---|---|---|---|---|---|
| | Methyl methacry-late | Butyl acry-late | Ethyl acrylate | Styrene | Ethyl acrylate | Butyl acrylate | Allyl acrylate | |
| Resin (A$_2$)-5 | 27 | 3 | | 42 | | 28 | 0.7 | 19 |
| Resin (A$_2$)-6 | 40 | 10 | | 30 | | 20 | 1.0 | 23 |
| Resin (A$_2$)-7 | 40 | | 10 | 30 | 10 | 10 | 1.5 | 27 |

EXAMPLE 4

125 Parts of water, monomers of the first stage in parts as shown in Table 6, 0.2 part of benzoyl peroxide and 2 parts of sodium N-lauroyl sarcosinate were introduced to the same reaction vessel as used in Example 1. After the interior of the vessel has been sufficiently flushed with nitrogen, the above-mentioned components were heated at 75° C. to polymerize monomers until the polymerization rate reached 95%.

After the polymerization of the first stage was finished, sulfuric acid was added in small amounts so that the latexes once assumed the creamy state. Thereafter, 125 parts of water, monomers of the second stage in parts as shown in Table 6, 1 part of polyvinyl alcohol, 1 part of lauroyl peroxide and 0.03 part of n-octyl mercaptan, were added to effect the suspension polymerization at 80° C. for 2 hours with stirring, followed by the heat treatment at 120° C. for 30 minutes to complete the polymerization, and further followed by the dehydration and drying to obtain granular polymer resins (A$_2$) and (A$_3$). The thus obtained resin (A$_2$) or (A$_3$) was added in an amount of 7 parts to 100 parts of the blend (1) of the thermoplastic resin (B), in order to measure the 60° C. specular gloss and Charpy impact strength of

TABLE 7

| | 60° Specular gloss (%) | Uniformity of dispersion | Remarks |
|---|---|---|---|
| Resin (A$_1$)-2 | 36 | G | Present Invention |
| Resin (A$_2$)-2 | 31 | G | Present Invention |
| Resin (A$_3$)-1 | 33 | G | Present Invention |
| Resin (A$_3$)-2 | 28 | G | Present Invention |
| Silica gel is used | 52 | P | Comparative Examples |
| Commercially available delustering agent is used | 44 | P | Comparative Examples |
| No delustering agent is used. | 87 | — | Comparative Examples |

G: Good, P: Poor

EXAMPLE 6

8 Parts of a resin (A$_1$), (A$_2$) and (A$_3$) shown in Table 8 or a commercially available delustering agent was added to 100 parts of an ABS resin (Diapet ® 3001, a product of Mitsubishi Rayon Co.) and was sufficiently mixed using a Henschel mixer. The mixture was extruded by an extruder hving a screw 40 mm in diameter at a temperature of 230° C., and was cut to prepare pellets. The pellets were dried and were injection-molded at 200° C. to prepare a board 3 mm in thickness, to measure the 60° specular gloss and the V-notched Izod impact strength. The results were as shown in Table 8.

The compositions of the present invention exhibit excellent delustering property and impact strength over the compositions of comparative examples.

TABLE 8

|  | 60° Specular gloss (%) | Izod impact strength (kg-cm/cm$^2$) | Remarks |
| --- | --- | --- | --- |
| Resin (A$_1$)-2 | 35 | 19.5 | Present Invention |
| Resin (A$_2$)-2 | 38 | 20.4 | Present Invention |
| Resin (A$_3$)-1 | 29 | 19.7 | Present Invention |
| Resin (A$_3$)-2 | 34 | 21.5 | Present Invention |
| Commercially available delustering agent is used | 81 | 6.2 | Comparative Examples |
| No delustering agent is used. | 95 | 23.4 | Comparative Examples |

What is claimed as new and desired to be secured by Letters Patent of the United States is:

1. A delustered thermoplastic resin composition, comprising:
   100 parts by weight of a thermoplastic resin (B) selected from the group consisting of a vinyl chloride resin, an acrylic resin, a methacrylic resin, a nylon, a polyethylene, a polycarbonate, and a polyethylene terephthalate; and 0.1 to 40 parts by weight of a resin (A) which consists essentially of: 80 to 20 parts by weight of a polymer or a copolymer component (I) obtained by polymerizing;
   (a) 30 to 100% by weight of at least one alkyl methacrylate in which the alkyl group has 1 to 4 carbon atoms;
   (b) 0 to 70% by weight of an alkyl acrylate in which the alkyl group has 1 to 13 carbon atoms; and
   (c) 0 to 50% by weight of a monoethylenically unsaturated monomer other than those of (a) and (b); and
   20 to 80 parts by weight of a copolymer component (II) obtained by polymerizing;
   (d) 30 to 90% by weight of an aromatic vinyl compound;
   (e) 10 to 60% by weight of at least one alkyl acrylate monomer in which the alkyl group has 1 to 13 carbon atoms;
   (f) 0 to 20% by weight of a monoethylenically unsaturated monomer other than those of (d) and (e); and
   (g) 0.05 to 10 parts by weight of a cross-linking monomer per 100 parts by weight of the total amount of the above components (d), (e) and (f) said resin (A) being prepared by polymerizing the monomers which constitute copolymer (II) in the presence of the polymer or copolymer component (I).

2. A delustered thermoplastic resin composition, comprising:
   100 parts by weight of a thermoplastic resin (B) selected from the group consisting of a vinyl chloride resin, an acrylic resin, a methacrylic resin, a nylon, a polyethylene, a polycarbonate, and a polyethylene terephthalate; and 0.1 to 40 parts by weight of a resin (A) which consists essentially of: 80 to 20 parts by weight of a polymer or a copolymer component (I) obtained by polymerizing;
   (a) 30 to 100% by weight of at least one alkyl methacrylate in which the alkyl group has 1 to 4 carbon atoms;
   (b) 20 to 70% by weight of an alkyl acrylate in which the alkyl group has 1 to 13 carbon atoms; and
   (c) 0 to 50% by weight of a monoethylenically unsaturated monomer other than those of (a) and (b); and
   20 to 80 parts by weight of a copolymer component (II) obtained by polymerizing;
   (d) 30 to 90% by weight of an aromatic vinyl compound;
   (e) 10 to 60% by weight of at least one alkyl acrylate monomer in which the alkyl group has 1 to 13 carbon atoms;
   (f) 0 to 20% by weight of a monoethylenically unsaturated monomer other than those of (d) and (e); and
   (g) 0.05 to 10 parts by weight of a cross-linking monomer per 100 parts by weight of the total amount of the above components (d), (e) and (f) said resin (A) being prepared by polymerizing the monomers which constitute copolymer component (II) in the presence of the polymer or copolymer component (I).

3. The composition of claim 1, wherein the crosslinking monomer which constitutes the copolymer component (II) is at least one compound selected from the group consisting of allyl methacrylate, triallyl cyanurate and triallyl isocyanurate.

4. The composition of claim 1, wherein the resin (A) is in the granular form having an average particle diameter of greater than 0.3 micron.

5. The composition of claim 1 wherein in said composition, 100 parts by weight of said thermoplastic resin (B) is combined with up to 10 parts by weight of said resin (A).

6. The composition of claim 1, wherein said monoethylenically unsaturated monomer in components I and II is fumaric acid, maleic acid, a carboxylic acid copolymerizable therewith or an ester thereof, a halogenated vinyl compound, a vinyl ester or acrylonitrile.

7. The composition of claim 1, wherein said composition further comprises the addition of at least one additive thereto selected from the group consisting of stabilizers, lubricants, processing aids, impact resistance aids, plasticizers, foaming agents, fillers, and coloring agents.

* * * * *